Nov. 24, 1964  C. W. MANAUGH  3,158,266
TRUCK ATTACHMENT
Filed April 29, 1963  4 Sheets-Sheet 1

Inventor
Carl W. Manaugh
By Edward L. Amonette
Agent

Nov. 24, 1964  C. W. MANAUGH  3,158,266
TRUCK ATTACHMENT
Filed April 29, 1963  4 Sheets-Sheet 2
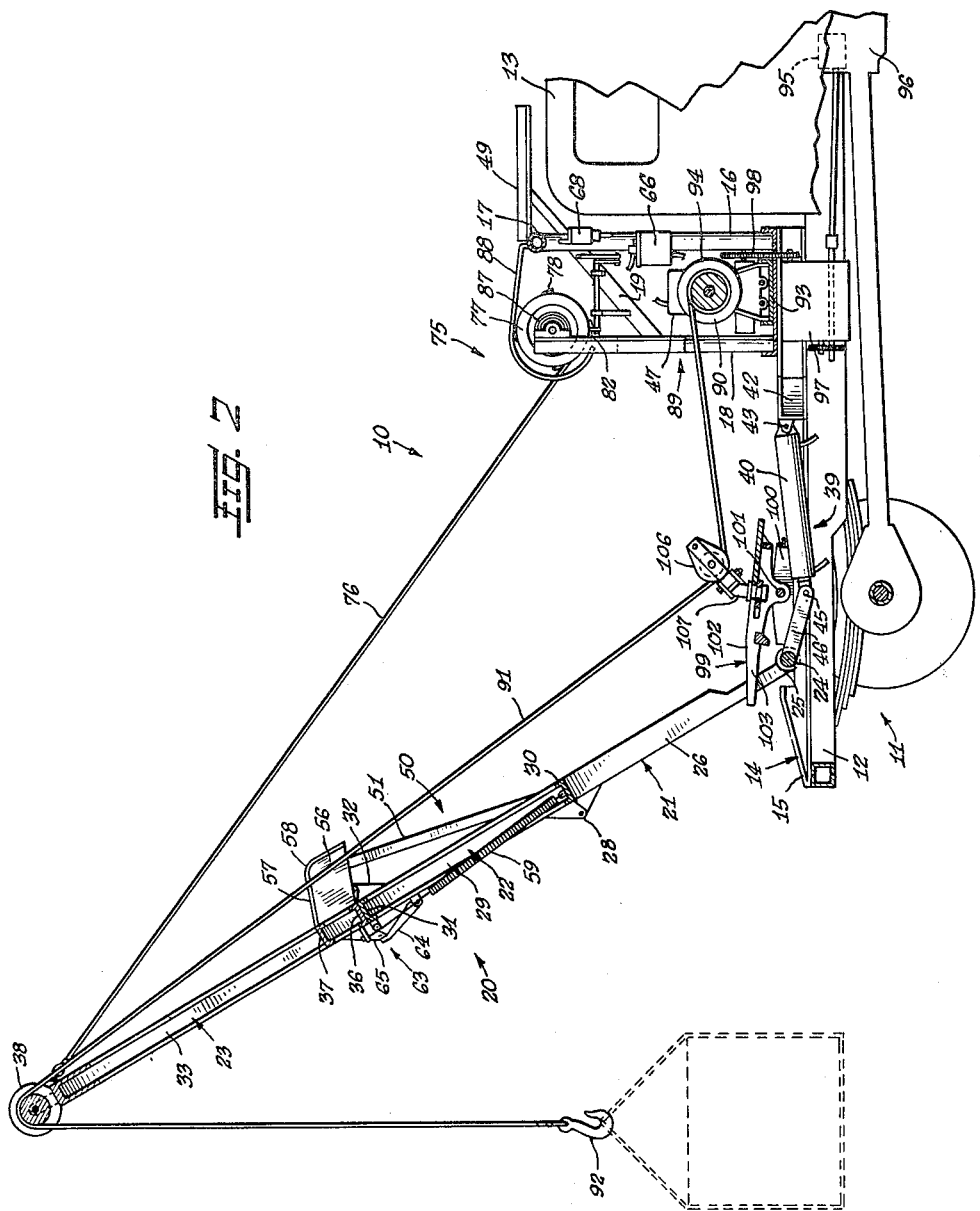
Inventor
Carl W. Manaugh
By Edward L. Amonette
Agent

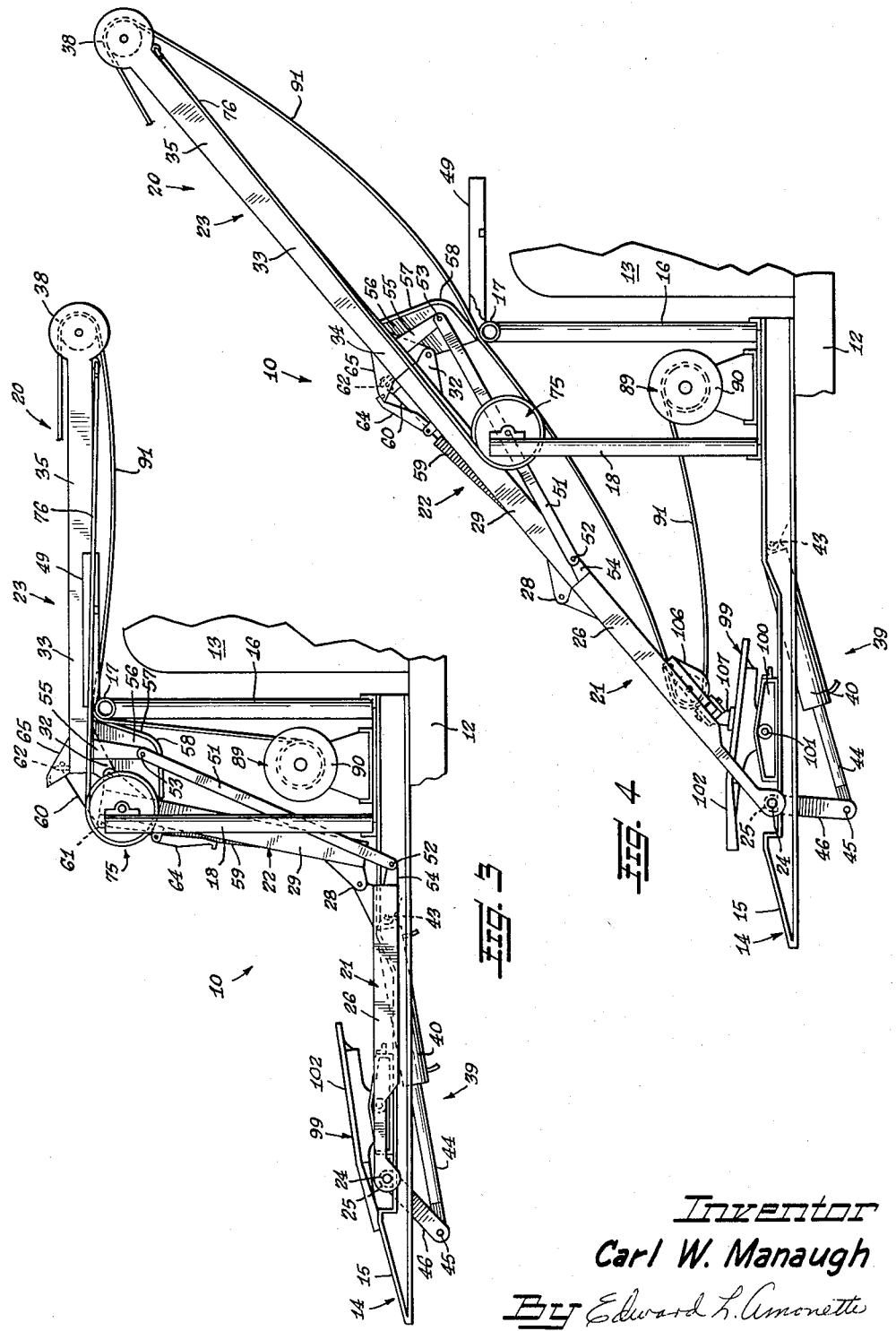

Nov. 24, 1964  C. W. MANAUGH  3,158,266
TRUCK ATTACHMENT
Filed April 29, 1963  4 Sheets-Sheet 4

Inventor
Carl W. Manaugh
By Edward L. Amonette
Agent

United States Patent Office 3,158,266
Patented Nov. 24, 1964

3,158,266
TRUCK ATTACHMENT
Carl W. Manaugh, 9610 Trumbull Ave. SE.,
Albuquerque, N. Mex.
Filed Apr. 29, 1963, Ser. No. 276,459
16 Claims. (Cl. 212—8)

My invention relates in general to truck attachments, and more particularly to a load-lifting attachment which will not detract from the usefulness of the truck in hauling.

Users of truck tractor and flat deck semitrailer combinations frequently are faced with the problem of loading and unloading random freight loads from the semitrailer, and of hoisting and moving the loads about a limited area after unloading. Usually the problem is expensively solved by using a specialized hoist vehicle in addition to the transport vehicle. This requires either the taking of the hoist vehicle along with the truck tractor and semitrailer, or the use of two or more hoist vehicles—one at the loading point and one at each unloading point. Most generally separate operators are required for the two types of vehicles, adding to the expense.

One of several devices which have been used on the transport vehicle for hoisting and limited moving of the load, eliminating the requirement for a separate hoist vehicle, is the A-frame hoist. Such hoist can be constructed to be carried in a disassembled condition on a semitrailer along with the load. When the destination is reached the truck tractor is disconnected from the semitrailer, the A-frame hoist is re-assembled on the truck tractor and is used to unload the semitrailer and to place the load where desired. Disadvantages of the A-frame hoist include: (1) The design inherently requires heavy booms which must be disassembled into relatively small pieces to be manhandled. (2) The assembly and disassembly are time-consuming and require a work area which is not always available. (3) Extensive modification of the truck tractor is necessary to accommodate the hoist, making it difficult to easily return the truck to normal transport use when the need for the hoist no longer exists. (4) Highway operation of the assembled truck tractor and A-frame is impossible without exceeding height and overhang regulations.

A general object of my invention is to provide a truck attachment which is installable on a truck tractor chassis without modification, which is operable by the truck driver from inside the cab, which automatically stores on the truck without exceeding height and overhang regulations and without interfering with attachment and pulling of a semitrailer, and which quickly and easily extends to the operating position for hoisting and moving a load from a detached semitrailer.

Another object of my invention is to provide a truck attachment which will hoist and move a load through the use of normal power means provided by the truck.

Briefly, these and other objects are accomplished by means of a segmented boom which is designed to be collapsed to a _/⎺-shaped attitude of repose behind and above the truck cab when not in active use, and to be rotated into rigid alignment when it is activated for hoisting. Provided with the boom are means for mechanically rotating it; means for assuring automatic alignment and disalignment of its segments at the proper times; guys for additionally supporting the boom and for selecting safe working angles thereof; and other details relating to these operations. With the aligned boom rotated overcenter to one of several selectable positions the task of lifing a load is accomplished by means of a conventional winch and a cable passed over a pulley fastened to the free end of the boom, said cable having a hook or other means secured to its free end for attaching to the load. Generally, movement of the load in a horizontal plane is accomplished by moving the truck after the load is lifted.

A clearer understanding of the structure and operation of my invention may be gained from the following detailed description taken in conjunction with the attached claims and accompanying drawing, in which:

FIG. 2 is a longitudinal section view taken generally on a line 2—2 of FIG. 1 with the boom in one of several overcenter positions suitable for lifting;

FIG. 3 is a side view showing the boom in the attitude of repose with certain details removed for greater clarity;

FIG. 4 is a view similar to FIG. 3 with the boom shown as it appears after alignment of the segments;

Figure 1:
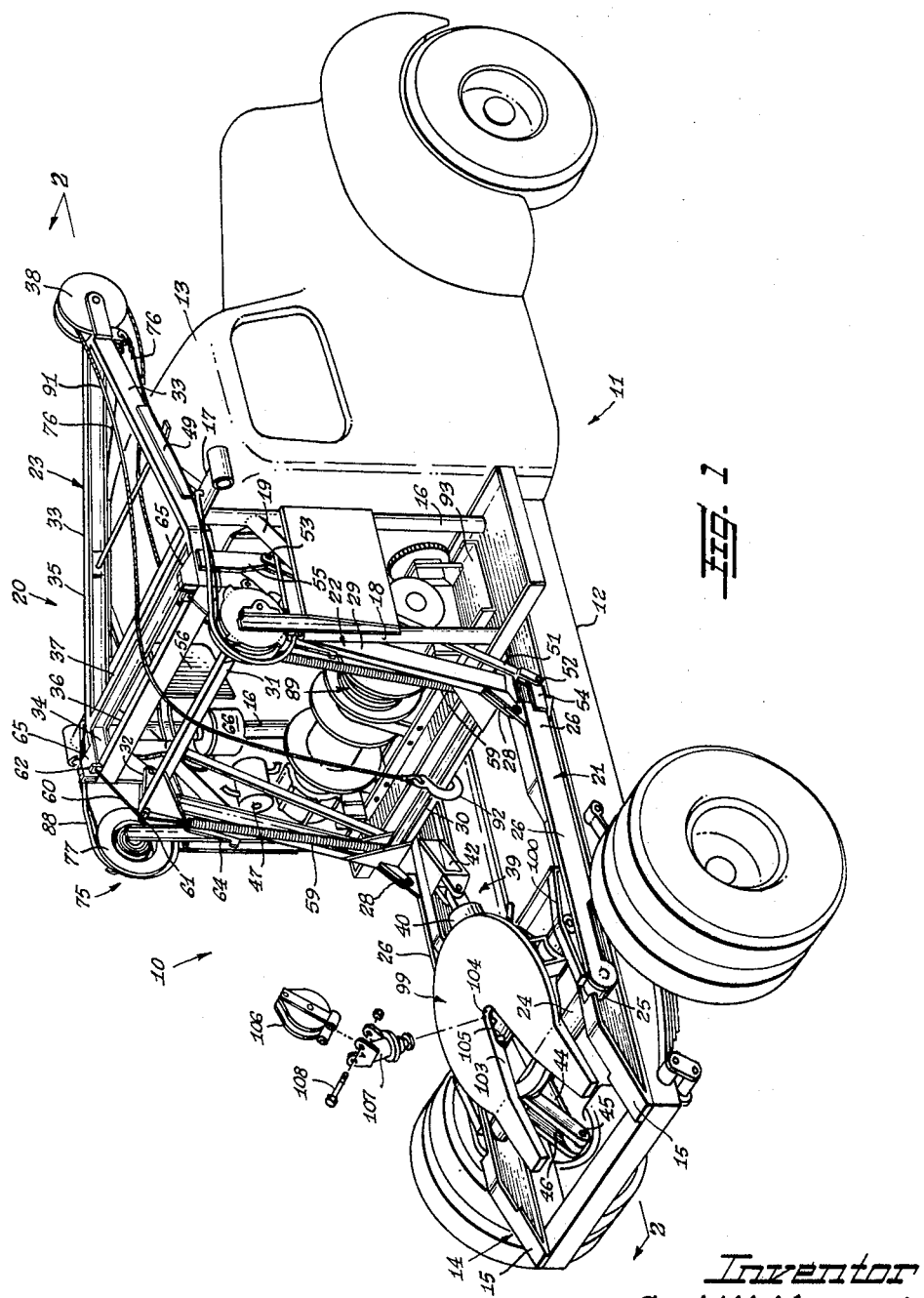
FIG. 1 is a perspective view of a preferred embodiment of my invention mounted on a truck with the boom in the attitude of repose.

Referring now to the drawing, my invention has been illustrated in a preferred embodiment as being mounted on a truck body of a type suitable for pulling a semitrailer, the hitch for such a trailer being shown as included as part of my attachment.

The truck attachment, denoted generally by the numeral 10, is shown mounted on a truck 11 having a frame 12 and a driver's cab 13 mounted thereon near the forward end. A base 14 including a pair of parallel beam members 15 is suitably secured to the top of frame 12. A pair of upright support members 16 rigidly secured to beam members 15 near their ends adjacent cab 13 rigidly support a cross member 17 at a level slightly above the top of cab 13. A second pair of upright members 18 mounted on beams 15 slightly rearward of members 16 and connected therewith by braces 19 cooperate therewith to provide a rigid support and stationary mounting for apparatus to be described later.

A boom 20 including lower, intermediate and upper segments 21, 22 and 23 respectively, is pivotally secured at its lower end to base 14. Lower segment 21 includes an axle 24 pivotally secured to base 14 by journals 25, and a pair of parallel side members 26 secured at one end to the outer end of axle 24. Hinges 28 pivotally interconnect lower segment 21 with intermediate segment 22, said intermediate segment including side members 29 rigidly interconnected at their ends by cross members 30 and 31 and disposed to align with side members 26 of lower segment 21. Hinges 32 pivotally interconnect intermediate segment 22 with upper segment 23, said upper segment 23 including side members 33 having parallel portions 34 converging portions 35. Parallel portions 34 are rigidly interconnected by cross members 36 and 37 and are disposed to align with side members 26 and 29 of lower and intermediate segments 21 and 22. Converging portions 35 are rigidly interconnected at their junction whereat is secured an idler pulley 38. Hinges 28 and 32 are respectively mounted at the rear and front of boom 20 as shown, to cooperate with abutting side members 26, 29 and 33 to achieve both automatic alignment and desired relative directions of rotation between said segments.

Boom rotating means 39 for urging rotation of boom 20 with respect to base 14 includes a hydraulic ram 40 having its cylinder 41 secured to a mounting 42 on base 14 by pivots 43 and having its piston 44 secured at its outside end by pivots 45 to a lever 46 which is rigidly fastened at one end to axle 24.

When not in active use boom 20 is collapsed to a ⌐/⌐-shaped attitude of repose as shown in FIGS. 1 and 3 wherein lower segment 21 lies substantially parallel to and flush with base 14 while upper segment 23 rests on cross member 17 and cradle 49 above the truck cab in substantially parallel relationship with lower segment 21. Intermediate segment 22 assumes an attitude inclined slightly forward of the vertical. During rotation of boom 20 from this position to the aligned position of FIG. 4 lower and upper segments 21 and 23 are maintained parallel by joining means 50, comprising tie rods 51 having their ends secured by pivots 52 and 53 to levers 54 and 55 rigidly secured to lower segment 21 and upper segment 23 respectively. Pivots 52 and 53 are so disposed with respect to hinges 28 and 32 that an imaginary line connecting the centers of 52 to 53 to 32 to 28 describes a parallelogram. Hence, forces urging rotation between the lower and intermediate segments are transfered equally to the upper segment to cause upper and lower segments to remain parallel until aligned. By corollary, forces restricting rotation between the intermediate segment and either of the other segments are transferred equally to the remaining segment by means 50.

To achieve the position of boom 20 shown in FIG. 4, lower segment 21 is rotated upward by boom rotating means 39. A plate 56 mounted on upper segment cross members 36 and 37 and having a downwardly and rearwardly extending camming edge 57 slidably engages cross member 17 to clear segments 22 and 23, hinges 32 and joining means 50 thereover. When curved portion 58 of cam edge 57 clears cross member 17 during upward rotation of lower segment 21, accelerated rotation between intermediate segment 22 and lower segment 21 takes place, said rotation in turn being transfered to upper segment 23 by means 50. In order to guarantee contact of cam edge 57 with cross member 17 during repose and during this initial phase of boom alignment, and to prevent inadvertent folding of the boom rearward through sudden forward acceleration of the vehicle or other contingencies I have provided a pair of springs 59. Each is attached at one end to cross member 30 of intermediate segment 22 and has its other end attached to a cable 60 which is guided over cross member 31 by means of an idler pulley 61 and secured to upper segment 23 by fastening means 62. Tension provided by springs 59 thus urges rotation between the intermediate and upper segments 22 and 23 towards alignment at all times. Because of the relatively greater control imposed on the lower segment 21 by the boom rotating means 39 this force is largely restricted to a forward and downward urging of the other two segments toward cross member 17 during repose and toward alignment during rotation of boom 20, thus counteracting any possible tendency on the part of these two segments to fold rearwardly on top of lower segment 21.

To assure positive alignment of the segments as shown in FIG. 4 and hence to guarantee rigidity of boom 20 during subsequent lifting operations I have provided boom locking means 63 comprising a pair of hooks 64 pivotally mounted on intermediate segment 22, and a corresponding pair of receiving members 65 secured to upper segment 23 and disposed for manual engagement when boom 20 is aligned. It can be seen that additional locking means need not be provided between the lower and intermediate segments since the force from locking means 63 restricting rotation between intermediate and upper segments 22 and 23 is transferred equally to lower segment 21 by interconnecting means 50. It is preferable to locking means 63 between the intermediate and upper segments rather than between the intermediate and lower segments because the former arrangement forces tie rods 51 to work in tension while the latter arrangement would tend to buckle them.

To return the boom from the aligned position of FIG. 4 to the repose position of FIG. 3, locking means 63 are manually disengaged and lower segment 21 is rotated downward by boom rotating means 39. As lower segment 21 is rotated past the angle shown in FIG. 4, contact is made between the camming edge 57 of plate 56 with cross member 17. At this point rotation begins between intermediate segment 22 and lower segment 21 and is transferred to upper segment 23 through interconnecting means 50, drawing upper segment 23 (resting on cross member 17 by means of cam plate 56) first rearwardly and then downwardly until the position of FIG. 3 is attained.

Figure 6:
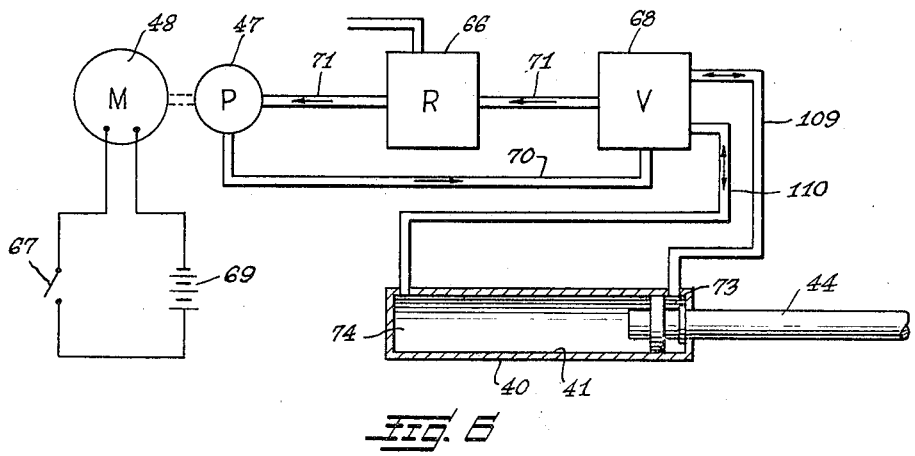
FIG. 6 is a diagrammatic view showing the boom rotating means with its associated apparatus and controls.

Boom rotating means 39 may be seen in FIG. 6 to further include a hydraulic supply and control system including a pump 47, electric motor 48 connected to said pump, a control valve 68 hydraulically connected to the output of said pump through line 70, a reservoir 66 located in fluid connection 71 between the return side of valve 68 and pump 47, and fluid connections 109 and 110 connecting the outputs of valve 68 with chambers 73 and 74 of hydraulic ram 40. Preparatory to rotating the boom, switch 67 is closed thereby completing a circuit between motor 48 and truck battery 69. With control valve 68 in its neutral position fluid is circulated back to pump 47 through fluid connection 71 and reservoir 66. To rotate boom 20 upward and thence to a rearward overcenter position, control valve 68 is shifted to pressurize chamber 73 thereby exerting a pulling force on lever 46 through piston 44. With boom 20 rotated to a rearward overcenter position such that its further rotation is urged by gravity, control valve 68 is shifted to pressurize chamber 74, thereby exerting a restraining force on lever 46. This latter pressure is then gradually relieved by manipulation of control valve 68 until the desired working angle of boom 20 is attained.

Figure 5:
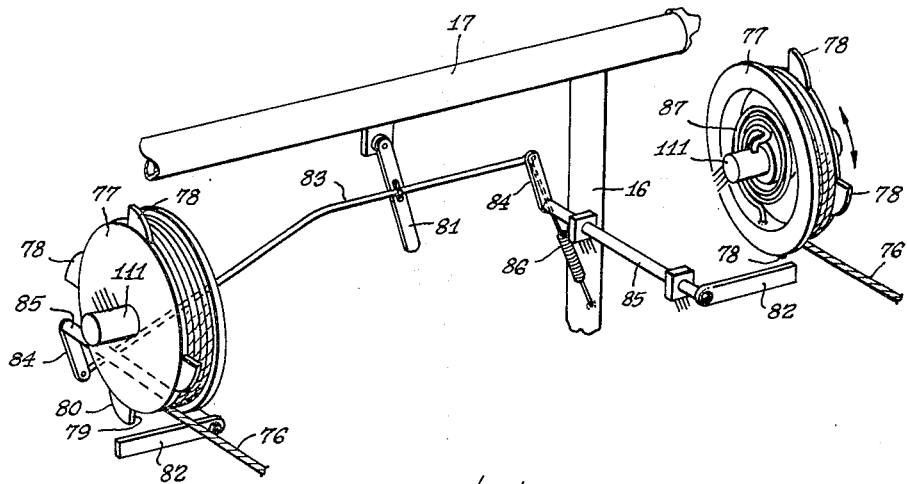
FIG. 5 is a perspective view of the guy control and storage means with other structures removed for clarity.

As the desired working angle of boom 20 is approached, means 75 for limiting rotation of the boom are actuated by the operator. As best shown in FIGS. 2 and 5, this means comprises a pair of guys 76 secured at one end to the free end of boom 20 and having their other ends secured to spring loaded drums 77 rotatably mounted on shafts 111 which are rigidly secured to upright members 18. Drums 77 are provided with a plurality of radially extending flanges 78 each having a flat edge 79 and a curved rear portion 80. A control lever 81 and locking levers 82 are connected by a linkage which includes transverse rod 83 pivotally secured to control lever 81 and to levers 84, said levers 84 being in turn rigidly connected to locking levers 82 by shafts 85 journaled on uprights 16 and 18. An overcenter spring 86 attached to upright 16 and connected to one of the levers 84 as shown maintains locking levers 82 in engagement or disengagement as desired.

As the desired working angle of boom 20 is approached, control lever 81 is moved to the left (FIG. 5) thereby rotating levers 82 upward into engagement with the leading edge of the next approaching flange 78, and halting further paying out of guys 76 from drums 77, thus preventing further rearward overcenter rotation of boom 20.

When boom 20 is again rotated toward the position of repose, drums 77 are turned by springs 87 to wind the guys thereon. Curved rear portion 80 of the first approaching flange 78 cams locking lever 82 downward thereby rotating lever 84 overcenter of spring 86 to a position maintaining disengagement. Guides 88 shown in FIGS. 1 and 2 assure winding of the guys on the drums.

The plurality of radial flanges 78 provides a number of safe, effective working angles of boom 20. In practice, the maximum length of guys 76, and hence the maximum overcenter rotation of boom 20, is determined first by the weight of load to be suspended from the boom which can be counterbalanced by the weight of the truck forward of the rear wheels, and second by the working angle between hydraulic ram 40 and boom rotating lever 46 which, as it approaches 180° imposes a greater burden on the boom rotating means in returning the boom to the position of repose. These relationships are easily calculated and adjusted in the design and fabrication of the unit.

To accomplish the object of lifting and moving objects I have provided hoisting means 89, which includes a conventional winch 90, a cable 91, and hook 92. Winch 90 is mounted on base 14 by means of channel member 93 secured thereto. Cable 91, having one end attached to drum 94 of winch 90, is passed over pulley 38 secured to the free end of boom 20 and may be attached manually to a load to be lifted by means of hook 92 secured to its free end.

To provide power for lifting, I have coupled winch 90 to a power takeoff 95 from truck transmission 96 through an optional power divider 97. The power divider has been included to accommodate a second winch (shown in FIG. 1) which is not an integral part of the present invention, having been added to the working model for the purpose of dragging objects. A chain 98 connecting a sprocket on winch 90 to a sprocket on one of the outputs of power divider 97 completes the transfer of power to winch 90. Forward and reverse motion of winch 90 is achieved by shifting gears in power takeoff 95. Controls for hoisting means 89 are arranged through conventional means to be manipulated from the same location as switch 67, hydraulic control valve 68 and control lever 81. I have found that a location which can be reached by the operator through the openable rear window of cab 13 serves ideally for said controls since it provides at the same time a good operator's view of the boom rotating and load hoisting operations.

In the embdiment illustrated here I have included a fifth wheel trailer hitch 99 which is mounted on base 14. Said hitch includes journals 100 mounted on beam members 15, said journals rotatably supporting on an axle 101 a platform 102 provided with a wedge-shaped slot 103, center hole 104 and hitch locking means 105. Hitch 99 may be used as shown in FIGS. 1, 2 and 4 to removably secure an auxiliary idler pulley 106 to base 14 for decreasing the angle of pull between winch 90 and the free end of boom 20. A male mounting member 107, stored with pulley 106 elsewhere during operation of the truck with a semitrailer, is inserted in hole 104 of the platform 102 and locked in place by hitch lock 105. Idler pulley 106 is then passed over hoist cable 91 and secured to mounting member 107 by means of bolts and nuts 108. This assembly is easily and quickly removed after use of the unit to again permit hitch 99 to serve its normal function. The provision of such an idler pulley 106 contributes to the safety of operation of my invention by decreasing any tendency of the hoist cable to rotate the boom toward the cab, a tendency which would be particularly increased in the near-vertical working angles of the boom, should cable 91 extend directly from winch 90 to pulley 38. Other mounting positions and means for idler pulley 106 could be devised, of course, but I have found the arrangement described to be particularly convenient and useful.

Truck 11, equipped with my invention in the form herein illustrated and described, can tow a semitrailer to the vicinity of a load to be lifted and transported. There the truck may be disconnected from said trailer and maneuvered into a position for engaging the load. By utilizing my attachment according to procedures outlined above, the load may be grasped, hoisted, placed on the trailer, and the trailer reconnected to the truck, all in a very short time and with a minimum of physical effort by only one person. Should a mounting on a flatbed or other type of truck be desired, it should be obvious that my invention could be adapted by anyone skilled in the art to suit such a preference.

It should be evident that my invention adds considerable versatility and usefulness to a truck by its addition; that it contains a number of features which contribute to the safety of its operation; and that its presence on a truck body will not interfere with the normal operation of the truck in any way. It can be further deduced that my invention can be provided at relatively low cost and attached to a truck in a very short time with few alterations to the truck.

I have described a truck attachment which has been proven through actual use to accomplish the objects herein stated. Although I have described my invention with a certain degree of particularity, it is understood that this has been done only by way of example and that numerous changes in details of construction and arrangement of parts may be resorted to without departing from the spirit and scope of my invention as hereinafter claimed.

I claim as my invention:

1. A truck attachment comprising in combination:
   a base;
   a tripartite segmented boom pivotally connected at one of its ends to said base, said boom having pivotally interconnected lower, intermediate and upper segments;
   means attached to said lower segment for rotating said boom upward from a _/⁻ -shaped attitude of repose to a straight line, thence to a rearward overcenter position;
   means joining said lower and upper segments for maintaining parallel relationship therebetween and for urging alignment thereof with said intermediate segment;
   means mounted on said base for urging said boom into said attitude of repose;
   and hoisting means operating in conjunction with said boom.

2. The truck attachment of claim 1 wherein said hoisting means comprises:
   an idler pulley secured to said boom near its free end and a winch mounted on said base and having a cable adapted to pass through said idler pulley, said cable having its free end adapted for attaching to a load for lifting or moving said load.

3. The truck attachment of claim 2 wherein said means joining said lower and upper segments comprises:
   a tie rod equal in working length to the distance between the centers of pivots interconnecting said segments with said intermediate segment and spaced from and parallel to an imaginary line connecting said centers, said tie rod being pivotally interconnected at its ends with said lower and upper segments.

4. The truck attachment of claim 3 wherein said means for rotating the boom comprises:
   a double-acting hydraulic ram having its ends pivotally interconnected with said lower segment and said base.

5. The truck attachment of claim 4 wherein said means for urging said boom into said attitude of repose comprises:
   a stationary member mounted on said base, said stationary member arranged and adapted to engage said boom near the pivotal interconnection of said intermediate and upper segments for interrupting alignment therebetween when said boom is lowered.

6. The truck attachment of claim 5 wherein is further provided:
   boom locking means comprising a latch cooperating between the intermediate segment and one of the other segments for assuring rigid alignment of said boom at times.

7. The truck attachment of claim 6 wherein is further provided:
   mechanism for further urging alignment of said boom, said mechanism comprising a spring having one of its ends attached to the intermediate segment and having its other end attached to one of the other segments, said spring arranged and adapted to urge rotation between said segments toward alignment.

8. The truck attachment of claim 7 wherein is further provided:
   means interconnecting said boom from a point upward from the base-connected end to said base for limiting rotation of said boom at various selectable rearward overcenter positions.

9. The truck attachment of claim 8 wherein said last-mentioned interconnecting mean scomprises:
   a guy connected between a point near the free end of said boom and a mounting above said base, said mounting including take-up means for retrieving slack in said guy when said boom is lowered, and means for limiting the length of said guy at several rearward overcenter positions of said boom.

10. The truck attachment of claim 9 wherein said take-up means includes:
   a spring-loaded drum rotatably mounted on a stationary member above said base.

11. The truck attachment of claim 10 wherein said means for limiting the length of said guy includes:
   several radial flanges spaced around the circumference of said drum;
   and control mechanism associated therewith and adapted for engaging said flanges to halt rotation of said drum.

12. The truck attachment of claim 11 wherein said control mechanism includes:
   a locking lever pivotally secured to a stationary mounting, capable of pivoting into engagement with a leading side of one of said radial flanges as said guy is being played out, and capable of pivoting out of engagement therewith as desired;
   and linkage connecting said locking lever with a remote control lever, said linkage including overcenter spring means arranged and adapted to maintain said locking lever in engagement with said radial flanges at times and in disengagement therewith at other times.

13. The truck attachment of claim 12 wherein is further provided:
   an auxiliary pulley connected to said base intermediate said winch and the base-connected end of said boom, said auxiliary idler pulley thus being adapted for receiving said winch cable to decrease the angle of pull between said winch and the free end of said boom.

14. The truck attachment of claim 13 wherein the connection of said auxiliary idler pulley with said base comprises:
   a fifth wheel trailer hitch including a platform pivotally connected to said base and having provided therein a wedge-shaped slot and a center hole adapted for receiving a male mounting member and having locking mechanism for retaining said male member in said center hole at times, said male mounting member having said auxiliary idler pulley secured thereto.

15. The truck attachment of claim 14 in combination with a truck tractor, said truck tractor having a cab, a rearwardly extending frame, power takeoff provision, and an electrical system, wherein:
   said base is mounted on said rearwardly extending frame;
   said hoisting means are mechanically coupled to said takeoff;
   said hydraulic ram is hydraulically coupled to a motor-driven pump, said motor being in turn electrically coupled to said truck tractor electrical system; and
   said lower and upper segments of said boom are arranged to lie in substantially parallel relationship with said truck frame rearward and above said cab respectively when in said attitude of repose.

16. A truck attachment comprising in combination:
   a base;
   a tripartite segmented boom pivotally connected at one of its ends to said base, said boom having pivotally interconnected lower, intermediate and upper segments;
   means including a double-acting hydraulic ram having its ends pivotally interconnected with said lower segment and said base for rotating said boom upward from a _/⁻-shaped attitude of repose to a straight line, thence to a rearward overcenter position;
   means joining said lower and upper segments including a tie-rod equal in working length to the distance between the centers of pivots interconnecting said segments with said intermediate segment and spaced from and parallel to an imaginary line connecting said centers, said tie-rod being pivotally interconnected at its ends with said lower and upper segments;
   means for urging said boom into said attitude of repose comprising a stationary member mounted on said base and adapted to engage said boom near the pivotal interconnection of said intermediate and upper segments for interrupting alignment therebetween when said boom is lowered;
   a mechanism for further urging alignment of said boom including a spring having one of its ends attached to the intermediate segment and having its other end interconnected with one of the other segments for urging rotation therebetween toward alignment;
   boom locking means including a latch cooperating between the intermediate segment and one of the other segments for assuring rigid alignment of said boom at times;
   means interconnecting said boom from a point upward from the base-connected end to said base, said means including a guy connected at one end to the boom near its free end and connected at its other end to a spring-loaded drum rotatably mounted on a stationary member above said base, said drum having a plurality of radial flanges adapted to be engaged by control means for limiting the length of said guy, said control means including a locking lever and a remote control lever and linkage including overcenter spring means connecting said levers for urging said locking lever into engagement with said radial flanges at times and disengagement therewith at other times;
   hoisting means including an idler pulley secured to said boom near its free end and a winch mounted on said base and having a cable adapted to pass through said idler pulley, said cable having its free end adapted for attaching to a load for lifting or moving said load; and
   an auxiliary idler pulley connected to said base intermediate said winch and the base-connected end of said boom for receiving said winch cable to decrease the angle of pull between said winch and said first-mentioned idler pulley, said connection of said auxiliary idler pulley with said base comprising a fifth wheel trailer hitch including a platform pivotally connected to said base and having provided therein a wedge-shaped slot and a center hole adapted for receiving a male mounting member and having locking mechanism for retaining said male member in said center hole at times, said male mounting member having said auxiliary idler pulley secured thereto.

References Cited in the file of this patent

UNITED STATES PATENTS

| | | |
|---|---|---|
| 2,595,897 | Shoemaker | May 6, 1952 |
| 2,662,654 | Eakin | Dec. 15, 1953 |
| 2,682,957 | Holmes | July 6, 1954 |
| 3,092,367 | Shelby | June 4, 1963 |